United States Patent [19]

Kikuchi

[11] 4,340,895

[45] Jul. 20, 1982

[54] DEGASSING INK SUPPLY APPARATUS FOR INK JET PRINTER

[75] Inventor: Masatsugu Kikuchi, Ebina, Japan

[73] Assignee: Xerox Corporation, Stamford, Conn.

[21] Appl. No.: 196,506

[22] Filed: Oct. 14, 1980

[51] Int. Cl.$^3$ .............................................. G01D 15/18

[52] U.S. Cl. .................................... 346/140 R; 346/75

[58] Field of Search ............................... 346/140 IJ, 75

[56] References Cited

U.S. PATENT DOCUMENTS

| | | | |
|---|---|---|---|
| 3,761,953 | 9/1973 | Helgeson et al. | 346/140 IJ X |
| 3,929,071 | 12/1975 | Cialone et al. | 346/140 IJ X |
| 3,930,258 | 12/1975 | Dick et al. | 346/140 IJ X |
| 3,971,039 | 7/1976 | Takano et al. | 346/140 IJ X |
| 4,079,384 | 3/1978 | Takano et al. | 346/140 IJ |
| 4,153,902 | 5/1979 | Kanayama | 346/140 IJ |
| 4,204,215 | 5/1980 | Nakarai | 346/140 IJ |
| 4,207,582 | 6/1980 | Yamamoto | 346/140 IJ |

*Primary Examiner*—George H. Miller, Jr.

[57] ABSTRACT

Means are disclosed for degassing a liquid ink used in an ink drop printer. The printer is the type wherein continuously generated drops are directed to a target with some being diverted from a path intersecting the target to a path intersecting a collection device or gutter. The collected liquid is recycled. The degassing is achieved by holding the gas pressure above the liquid ink in a closed supply vessel below the ambient atmospheric pressure. In addition, the liquid ink in the supply vessel is heated. The low gas pressure and elevated ink temperature reduces the quantity of gas dissolved in the ink and thereby prevents the formation of gas bubbles in the printer system.

8 Claims, 3 Drawing Figures

DEGASSING INK SUPPLY APPARATUS FOR INK JET PRINTER

BACKGROUND

This invention relates to ink drop or ink jet printers of the type wherein drops are continuously produced from a continuous stream of liquid emitted under pressure from a nozzle and selected drops are charged and electrostatically deflected between paths intersecting either a target or a gutter. More specifically, this invention relates to ink supply apparatus for such printers having means for degassing the liquid. By degassing is meant the removal of gas bubbles from a liquid ink or the prevention of the generation of gas bubbles in a liquid ink.

Continuous drop printers of the present type are adversely affected by gas bubbles in the ink. For example, the gas bubbles change the nature of the sonic stimulation of the liquid. The sonic stimulation is used to promote uniform drop shape, space between drops and point of drop formation. A piezoelectric transducer coupled to a manifold housing the ink is one device for sonically stimulating the ink. Gas bubbles are also the source of other undesired effects in the printer system.

Accordingly, it is a main object of this invention to suppress the formation of gas bubbles in the ink of an ink jet printer.

Another object of this invention is to rid the ink in the manifold of a drop generator and in the ink supply of gas bubbles to obtain improved print operation.

The above and other objects of this invention are achieved by degassing the ink suply for the printer. Two means for degassing are used separately or jointly. One means is to reduce the gas pressure adjacent the ink in the ink supply vessel. The second means is to heat the ink in the ink vessel. A principal cause for the generation of gas bubbles is the change in pressure in the drop generator manifold when the continuous drop stream is turned off. The pressure falls from a high operation level to a low ambient pressure level. Gases dissolved in the liquid at the high pressure are released at the lower pressure.

In this invention, the ink supply that feeds the manifold is processed to reduce the quantity of gas dissolved in the ink. As stated, this is achieved by reducing the gas pressure above the ink, by heating the ink or by a combination of the two techniques.

THE PRIOR ART

A Takano and Sumitomo U.S. Pat. No. 4,007,684 discloses an ink liquid warmer 30 located in the conduit 22 to a nozzle 24 in unit 32. The warmer is employed in continuous drop printing apparatus of the present type. The warmer 30 is used to control the viscosity of the ink and no mention is made of degassing the ink.

Other patents in the area include U.S. Pat. Nos. 3,970,222; 4,042,937; 4,084,185; 4,089,007; and 4,153,902. These patents disclose ink supply systems for ink drop printers. None of these patents disclose the use of heat or low pressure as a means for degassing the liquid ink. The Takano et al. patent supra also fails to disclose the use of low pressure to degas the liquid ink.

THE DRAWINGS

Other objects and features of the present invention are apparent from the present specification, from the drawings and from a combination of the specification and drawings. The drawings are:

DETAILED DESCRIPTION

Henry's law states that the weight of gas that dissolves in a given quanitity of liquid is proportional to the pressure of the gas above the liquid. Thus, if air is in contact with water at standard atmospheric pressure, each kilogram of water dissolves 0.017 gram of oxygen at 20° C. If the pressure is halved, the water dissolves only 0.0085 gram of oxygen. See the *Condensed Chemical Dictionary,* 8th Edition, Nostrand Reinholt Company, 1971 at page 436 for a statement of Henry's law. Furthermore, the amount of a gas dissolved in a liquid with which it is in contact decreases with an increase in the temperature of the liquid. The above pressure and temperature parameters are controlled in an ink supply vessel to reduce the amount of gas dissolved in a continuous ink drop printing system.

Figure 1:
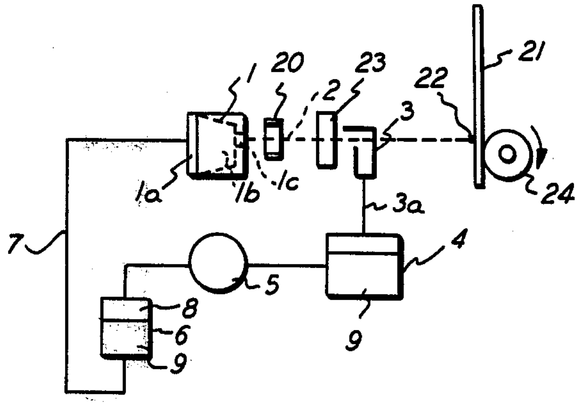
PRIOR ART FIG. 1
FIG. 1 is a schematic of a continuous ink drop printer of the prior art including a gutter and ink supply apparatus.

FIG. 1 shows a continuous drop printing system of the present type. An ink drop generator 1 includes a piezoelectric transducer 1*a* coupled to a manifold 1*b* that contains the liquid ink from which drops are formed. Ink under pressure in the manifold 1*b* is emitted as a continous stream through nozzle 1*c.* The manifold has at least one nozzle. Alternately, the manifold is up to 8.5 inches long, for example, and includes many nozzles to enable a full line of points on an 8.5 inch wide target such as plain paper to be addressed by an ink drop as the target moves relative to the generator 1. A continuous stream of ink drops 2 is formed from the continuous stream of liquid emitted from a nozzle 1*c.* The point at which drops are created from the continuous stream, the size of the drops and spacing of the drops are all substantially stable due to a sonic stimulation of a liquid in manifold 1*b* by the piezoelectric transducer 1*a.*

The charging electrode 20 is located at the point of drop formation. Individual drops are charged when a voltage is applied to the charging electrode. In this example, the uncharged drops follow a flight path that intersects the drop gutter 3. Charged drops are deflected in the plane defined by the dotted line 2 and follow flight paths that bypass the gutter and intersect a target 21 along some point on a print line 22.

The charged drops are electrostatically deflected by an electric field established between a pair of parallel deflection electrodes on either side of the flight path. The flat plate electrode 23 on the far side of drops 2 is the only electrode shown for clarity. A like electrode is also located on the near side of the drops 2 but is deleted so the drops 2 can be seen. A bias voltage difference of about 2000 volts is typical of the level coupled between the deflection electrodes. The charge on the drops is typically from zero to about 100 volts.

The target 21 moves relative to the drop generator 2 by an appropriate drive means represented by the wheel 24 frictionally engaging the back of the target. This enables succesive print lines 22 to be generated. The resultant image on the target is formed from a raster pattern including multiple points in multiple scan print lines 22.

The above system alternately may have charged drops rather than uncharged drops going into the gutter.

The gutter 3 collects those drops not intended for the target 21. The liquid collected by the gutter is reused by the printer. A fluid conduit 3*a* fluid couples the gutter 3 to the ink supply vessel 4. Vessel 4 contains the liquid ink 9 used by the printer. This prior art vessel 4 is open to the ambient atmospheric pressure. The ink 9 is pumped to the drop generator 1 by the pump 5. A bubble catcher 6 is in the supply line or conduit 7 between the pump 5 and the drop generator 1. The liquid is delivered to manifold 1*b* at a pressure adequate to cause the emission of a liquid stream from the nozzle 1*c*. The bubble catcher includes the space 8 for collecting gasses from bubbles forming from the ink. The bubble catcher 6 is located in line 7 to prevent the gas bubbles generated in the system from reaching the manifold 1*b*. In contrast, the present invention is directed to preventing the generation of gas bubbles in the first place by preventing or at least significantly limiting the dissolution of gasses in the ink in the supply vessel.

Figure 2:
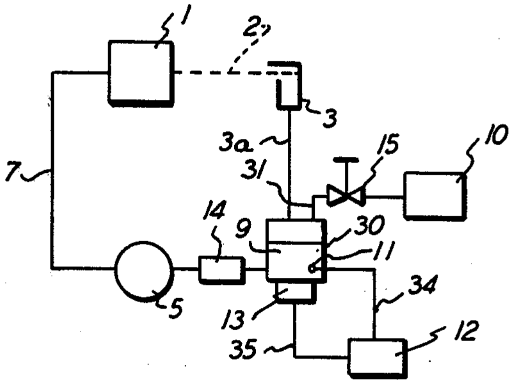
FIG. 2 is a more simplified schematic of a continuous ink drop printer as in FIG. 1 (with some components deleted for clarity) and including one embodiment of degassing ink supply apparatus according to the present invention.

The degassing ink supply apparatus of this invention is shown in FIG. 2. Like reference numbers for like elements are used throughout FIGS. 1–3. The apparatus includes the ink supply vessel 30, the heater 13, the temperature sensor 11, the temperature controller 12, the needle valve 15 and the vacuum pump 10. The vessel 30 is a closed container being fluid coupled to the gutter 3 via conduit 3*a* and to the needle valve 15 and vacuum pump 10 via conduit 31. The supply apparatus also includes the cooler means 14, the pump 5 and the supply conduit 7 that fluid couples the manifold 1*c* to the pump and supply vessel.

In operation, the manifold in drop generator 1 receives ink under pressure via conduit 7. The unused drops emitted by generator 1 are collected in gutter 3 and the liquid from the drops returns to the ink supply vessel 30 via conduit 3*a*. The vessel 30 includes a space above the liquid 9 which has a negative pressure drawn on it by the vacuum pump 10. By negative pressure is meant below the ambient atmospheric pressure. The reduced air pressure above liquid 9 reduces the amount of gas dissolved in liquid 9. The needle valve 15 operates to maintain the negative pressure at a substantially constant predetermined level.

The heater means 13 includes an electrical resistance heating coil and it raises the temperature of the liquid ink above the ambient liquid temperature but below the boiling point. The vacuum pump 10 valve 15 operate to keep the gas pressure at the desired negative level as the temperature of the liquid is raised thereby increasing its vapor pressure.

The temperature sensor 11 electrically detects the liquid temperature and a signal representative of the temperature is supplied over the electrical signal wire 34 to the temperature controller 12. The sensed temperature signal is compared to a signal represented of a desired elevated temperature. In response to the comparison, the current to heating means 13 is supplied over the electrical wire 35 to maintain the liquid at a desired elevated temperature.

The heated liquid 9 is cooled by the cooler means 14 as it flows in conduit 7 to the pump 5. The cooled ink has the desired viscosity for appropriate drop generation. The cooler means 14 includes a passive heat exchanger including a plurality of fins in contact with the liquid as it flows over and around the fins. The fins in turn extend from the enclosed fluid path into the surounding region in which the heat is dissipated. Optionally, a fan (not shown) is used to blow air over the fins. The cooler means may be any appropriate heat exchanger such as that analogous to an automobile radiator.

A bubble catcher such as catcher 6 in the prior art system of FIG. 1 is not necessary but could be used if desired. However, one advantage of this invention is that the liquid is purged of dissolved gasses in its reservoir or supply vessel thereby making the bubble catcher unnecessary. Gas bubbles are generated in the FIG. 1 prior art system of FIG. 1 because gasse dissolve in the liquid 9 at the ambient temperature and at the ambient atmospheric pressure. The catcher 6 traps free gas bubbles in the liquid 9 but dissolved gasses pass through the catcher to the drop generator 9. When the high pressure exerted on the liquid in manifold 1 is released such as when the pump 5 is turned off, the dissolved gasses come out of solution as bubbles and remain trapped in manifold 1. When the pump is turned on, the gas bubbles remain in the manifold and in other parts of the fluid system. These trapped bubbles cause various undesirable system side effects.

In contrast, the heater 13 and vacuum pump 10 of the present invention reduce the amount of dissolved gas in the system in the first instance. Consequently, the creation of gas bubbles is suppressed and the undesirable system side effects are avoided.

Figure 3:
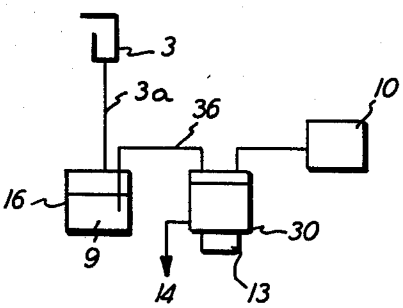
FIG. 3 is a schematic of another embodiment of degassing ink supply apparatus according to the present invention.

FIG. 3 shows another embodiment of the degassing ink supply apparatus of the present type. Here the gutter 3 is coupled to the ink supply vessel 30 through an intermediate ink collection vessel 16. The ink caught by the gutter flows via conduit 3*a* into the open container or vessel 16. The conduit 36 fluid couples the liquid 9 in vessel 16 to the closed ink supply vessel 30. The needle valve 15 is replaced in this embodiment by other appropriate means (not shown) for maintaining a vacuum above the liquid in vessel 30. The sensor 11 and temperature controller are deleted in this view as well as the pump 5 to simplify and thereby clarify the drawing.

Other modifications and variations to the disclosed embodiments will be apparent to those of ordinary skill in the art. Such modifications and variations are intended to be within the scope of this invention.

I claim:

1. In an ink drop printer of the type wherein ink drops are continuously produced from a continuous stream of liquid ink emitted under pressure from at least one nozzle coupled to a manifold containing the ink, the improvement being degassing ink supply apparatus comprising an ink supply vessel for storing a liquid ink from which the ink drops are produced including a space above a liquid containing gasses, pump means for supplying ink in the supply vessel to the manifold at a drop producing pressure and degassing means coupled to the supply vessel including heating means for heating liquid in the supply vessel for degassing a liquid contained therein.

2. The apparatus of claim 1 wherein the degassing means further includes vacuum means coupled to the supply vessel for reducing the gas pressure in the space above a liquid in the vessel.

3. The apparatus of claim 2 further including cooling means coupled between the pump means and vessel for cooling liquid heated by the heating means.

4. An ink drop printer of the type wherein ink drops are continuously produced from a continuous stream of liquid emitted under pressure from at least one nozzle coupled to a manifold containing the liquid ink and wherein selected drops are charged by a charging electrode located at the point of drop formation and charged drops are electrostatically deflected either from a flight path intersecting a gutter or a flight path intersecting a target to be printed by an electric field in the flight path of charged drops, the improvement being degassing ink supply apparatus comprising an ink supply vessel for storing a liquid ink from which the drops are produced having a space above a liquid containing gasses and fluid coupled to the gutter to receive drops intersecting the gutter, pump means coupled to the vessel for supplying ink to the manifold at a drop producing pressure including pump control means for switching the liquid pressure in the manifold between an ambient level and the higher drop producing level and degassing means for degassing liquid in the vessel including vacuum means coupled to the vessel to reduce the gas pressure in the space above the liquid below the ambient gas pressure level and heater means for heating the liquid in the vessel above the ambient liquid temperature.

5. The apparatus of claim 4 further including cooling means coupled between the pump means and vessel for cooling heated liquid.

6. The apparatus of claim 4 wherein the gutter and ink supply vessel are fluid coupled by a collection vessel coupled between the gutter and the supply vessel.

7. The apparatus of claim 4 wherein the degassing means further includes a temperature sensor coupled to the liquid in the vessel and a temperature controller coupled between the sensor and the heating means to maintain a desired temperature profile for the liquid for the degassing of the liquid.

8. The apparatus of claim 7 further including degass control means coupled to the degassing means for activating the degassing means when the pump means is switched to an ambient pressure level from the drop producing level.

* * * * *